(12) United States Patent
Stevens et al.

(10) Patent No.: US 8,058,342 B1
(45) Date of Patent: Nov. 15, 2011

(54) COMPOSITION AND METHOD OF SEALING AND PROTECTING ASPHALT SHINGLES OR OTHER POROUS ROOFING AND CONSTRUCTION MATERIALS

(75) Inventors: Thomas H. Stevens, Port St. Lucie, FL (US); William Andrew Stevens, Port St. Lucie, FL (US)

(73) Assignee: Enviroseal Corporation, Port St. Lucie, FL (US)

( * ) Notice: Subject to any disclaimer, the term of this patent is extended or adjusted under 35 U.S.C. 154(b) by 1102 days.

(21) Appl. No.: 11/450,633

(22) Filed: Jun. 9, 2006

Related U.S. Application Data

(60) Provisional application No. 60/688,764, filed on Jun. 9, 2005.

(51) Int. Cl.
*C08F 220/10* (2006.01)
*C08K 3/30* (2006.01)
*C08K 5/07* (2006.01)
*C08K 5/54* (2006.01)

(52) U.S. Cl. ........ 524/560; 524/359; 524/423; 524/261; 524/267

(58) Field of Classification Search .................. 524/560, 524/26, 267, 423, 359
See application file for complete search history.

(56) References Cited

U.S. PATENT DOCUMENTS

| | | | |
|---|---|---|---|
| 4,291,086 A | 9/1981 | Auten | |
| 4,571,415 A | 2/1986 | Jordan | |
| 4,749,731 A | 6/1988 | Kyminas | |
| 4,859,723 A | 8/1989 | Kyminas | |
| 4,870,796 A | 10/1989 | Hart | |
| 5,254,608 A * | 10/1993 | McClure | 524/91 |
| 5,434,009 A | 7/1995 | Urbanek | |
| 6,503,413 B2 * | 1/2003 | Uchiyama et al. | 252/8.91 |
| 6,881,786 B2 * | 4/2005 | Swarup et al. | 524/802 |
| 2005/0131176 A1 * | 6/2005 | Zhao | 526/207 |

OTHER PUBLICATIONS

Miknis, F.P. et al. (Miknis. F. P., A. T. Pauli A. Beemer, and B. Wilde, 2005, ) "Use of NMR Imaging to Measure Interfacial Properties of Asphalts." Fuel, 84:1041-1051. Abstract.
Graham, M.S. "Enhancing Wind Resistances; FEMA Attempts to Improve High-wind Performances of Asphalt Shingles and Tile", National Roofing Contractors Association, http:/www.nrca.net/, 2005.
Florida Building Code 2004 Test Protoco's for High-Velocity Hurricane Zones, International Code Council Inc, Oct. 2004.

* cited by examiner

*Primary Examiner* — Satya Sastri
(74) *Attorney, Agent, or Firm* — Lynn Schwenning

(57) ABSTRACT

Sealing compositions and application methods for sealing and protecting asphalt roof shingles or other porous roofing and construction materials are described for eliminating algae, mold and mildew, increasing granular adhesion, providing additional UV protection and significantly increasing the wind resistance of the roof or other construction material. The sealing composition includes an acrylic polymer that has been modified by a silicone surfactant to alter its wetting properties so as to promote wicking of the sealer under asphalt shingles and at open edges to prevent curling and water infiltration. The method of applying the sealing composition promotes uniform distribution of the product on the surface of installed roofs as well as enhances bonding between individual shingles by improved penetration on and between shingle layers to increase adhesion area.

17 Claims, 2 Drawing Sheets

COMPOSITION AND METHOD OF SEALING AND PROTECTING ASPHALT SHINGLES OR OTHER POROUS ROOFING AND CONSTRUCTION MATERIALS

CROSS-REFERENCE TO RELATED APPLICATIONS

Continuation-in-part of U.S. Provisional Patent Application 60/688,764 filed Jun. 9, 2005.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE TO MATERIAL SUBMITTED ON A COMPACT DISC

Not Applicable.

BACKGROUND OF THE INVENTION

Roofing systems of varying pitches used on homes and buildings located in tropical/semi-tropical and hurricane-prone areas face many challenging conditions that can adversely affect the integrity and lifetime of the roof. Some of the most commonly used types of roofing systems include asphalt shingles and clay or concrete tiles. Because shingled or tile roof systems are individual pieces or components installed in a single fashion, these types of roofing systems are especially susceptible to damage due to high winds, especially winds in excess of 100 mph or more that can occur during hurricanes or other tropical storms. Other conditions that can often be more intense in tropical/semi-tropical areas include high UV exposure and high humidity that results in mold, mildew and algae growing on the roof.

Typically, asphalt shingles are composed of a base material, an asphalt mixture, and a surfacing material. The base material is usually either organic felt or glass-fiber mat. The base material provides support for the weather-resistant components and gives strength to the shingle. The asphalt mixture includes asphalt, limestone and other mineral stabilizers. Asphalt is a complex mixture of hundreds of aliphatic and aromatic compounds. The surfacing material is generally in the form of mineral granules, which provide protection from impact and UV degradation and improves fire resistance. As asphalt ages due to UV exposure, expansion and contraction, it breaks down chemically and physically. Granule loss may subsequently occur due to the changes in the asphalt layer or due to mechanical forces such as high winds or other impacts to the roof. The result of all these challenges is that the shingles are weakened structurally and highly susceptible to further damage and/or failure.

It is known to protect and extend the life of existing roofing systems by applying a coating to the shingles or other type of roofing material after its installation. Typically, these protective coatings are highly viscous materials that adhere to the existing roof system to form an additional layer that provides a further barrier to weather. Examples of this type of coating system are described in U.S. Pat. Nos. 4,571,415; 4,859,723; and 5,434,009. These types of coating systems cover the existing roof system and therefore, destroy any aesthetic value of the roof such as architectural singles or clay/cementatious tiles. The present invention overcomes the disadvantages of the known roof coating systems by providing a clear sealer that wicks into the existing roof structure and results in a shingle, tile, or other porous construction material that is highly water resistant, stronger, and still retains its original look.

BRIEF SUMMARY OF THE INVENTION

This invention is directed to sealing compositions and application methods for sealing and protecting asphalt roof shingles or other porous roofing and construction materials by eliminating algae, mold and mildew, increasing granular adhesion, providing additional UV protection and significantly increasing the wind resistance of the roof as per state building codes, such as Florida Building Code TAS-100-95. The sealing composition includes a low viscosity film forming component that has been modified to alter its wetting properties so as to promote wicking of the sealer under asphalt shingles and at open edges to prevent curling and water infiltration. It also seals pores and other discontinuities in the roof system, sealing it from moisture infiltration without affecting its ability to breathe and allowing vapors to evaporate. The sealing composition also includes at least one biocide to protect the roof from algae, mold, or mildew related degradation and staining. The method of applying the sealing composition promotes uniform distribution of the product on the surface of installed roofs as well as enhances bonding between individual shingles by improved penetration on and between shingle layers to increase adhesion area.

DETAILED DESCRIPTION OF THE INVENTION

Figure 1:
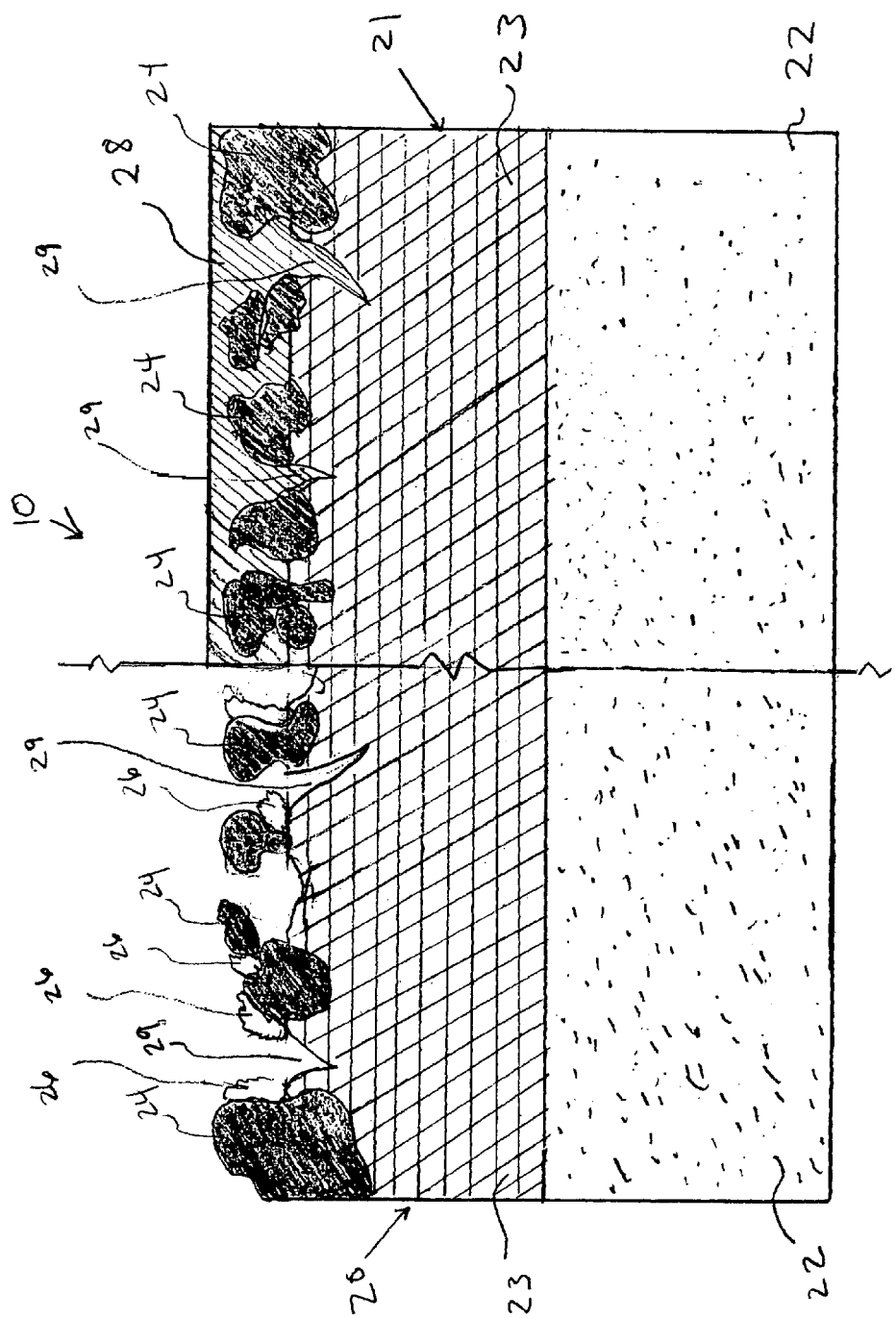
FIG. 1 is a cross sectional view of a composite asphalt shingle, half of which has been sealed with the invention.

This invention is directed to a water-based, polymeric film composition and an in-situ method of applying it to composite asphalt shingles or other porous roofing or construction materials to seal the material and prevent degradation and destruction of the material due to UV exposure, algae, mildew and mold, excessive wind, rain and naturally occurring disasters such as hurricanes and hail. In particular, the inventive composition has been shown to provide superior wind resistance on existing shingles, as measured by Florida Building Code TAS-100-95. (Capable of withstanding 110 to 130 mph winds and 8.8 inches of water per hour with no roof leakage.) These sealing compositions and application methods provide a simpler, immediate and more versatile construction route to enhance the wind resistance of existing structures and strengthen new roof construction.

The sealing composition of this invention includes a film forming polymer, a surfactant, and additives such as UV inhibitors, biocides, and curing agents that are mixed with water to form an aqueous solution that is capable of wicking into asphalt shingles or other porous construction materials, thereby protecting the shingle or material from damage due to sun, wind, mold etc. The sealing composition dries into a transparent film or membrane that is fully adhered to the shingle or other material.

In particular, the inventive composition is formulated to have a surface tension that provides for maximum wicking of the composition into the fissures and other irregularities found in composite asphalt shingles or other porous construction materials. The ability of a liquid to wet a solid surface is determined from the surface tension values of both the liquid and solid. In order for a liquid to wet out a solid, its surface tension should be about 10 dynes/cm higher or lower than the solid surface tension. Asphalt-liquid surface tensions have been measured to range from about 25 to 40 dynes/cm. ("*Use of NMR Imaging to Measure Interfacial Properties of Asphalts*" Miknis, F. P. et al., Western Research Institute—Laramie, WY.) Reducing surface tension is the preferred route to provide maximum wicking of the sealing agents. As such, the sealing composition is preferably formulated to have a surface tension in the range of about 15 to about 30 dynes/cm. For comparison, water without any additives has a surface tension of about 70 dynes/cm.

The sealing composition is also formulated so that it contains about no more than about 30% by weight of solids. The amount of solids present in the composition will affect the ability of the composition to pass through the voids in the surface granules of the shingles. For use on all types of porous construction materials, the sealing composition contains about 10% to 40% solids by weight. For most roof system applications, the sealing compositions contain about 20% to about 30% solids by weight. More particularly, the inventive sealing includes about 22% to about 28% solids by weight for asphalt applications and about 21% to about 24% solids by weight for cementatious or clay tiles.

The sealing composition of the present invention includes several other properties that provide advantages over other roof coating compositions. The present sealing composition is formulated to have a theoretical density of about 8.0 lbs/gal to about 9.0 lbs/gal. For asphalt and cementatious/clay tile applications, the sealing composition typically has a density of about 8.3 lbs/gal to about 8.9 lbs/gal, and preferably about 8.6 lbs/gal to about 8.8 lbs/gal. The pH of the sealing compositions should be formulated to be compatible with the roof system to which it is being applied. Since asphalt roof systems often contain limestone, it is desirable to formulate these sealers having a pH in the range of about 7 to 10, preferably about 8 to 9. Formulations for use on asphalt roof systems and cementatious and clay tiles typically have a pH of about 8. Finally, the present sealing composition is formulated to have very low volatile organic components (VOCs). Typically, the sealer contains less than about 250 gm/L VOCs.

The film forming polymer used in the composition can be any polymer that is water based and provides good adhesion to shingles or other porous construction materials. Acrylic polymers are particularly advantageous due to their low cost, good adhesion to asphalt shingle substrates and excellent UV protecting properties. Co-polymers such as acrylic/vinyl and urethane/polyethylene can also be used. In particular, the PaveCryl® 100 Vinyl and Acrylic Asphalt Modifiers developed by Rohm and Haas (Philadelphia, Pa.) have been found to be effective for the inventive sealing composition. The PaveCryl® line includes PaveCryl 2500, Pavecryl 3077, PaveCryl 9100, PaveCryl Suppress, and PaveCryl Suppress Plus. Other acrylic polymers that are suitable for use in this invention include Acronal NX 3717 (BASF) and Flex Bond 325 Emulsion (Air Products).

The surfactant used in this coating promotes enhanced wicking of the composition into the shingles. Surfactants, or surface-acting agents, are a broad category of compounds that facilitate and enhance the absorbing, emulsifying, dispersing, spreading, sticking, wetting or penetrating properties of various compositions, such as the coating of this invention. The absorption of the coating into the shingle prevents curling of the shingle edges, thereby reducing water infiltration into the roof substrate. The surfactant used in the coating includes at least one surfactant selected from the group consisting of anionic, nonionic, cationic, amphoteric, silicone, fluorinated, polymeric surfactants and mixtures thereof. The anionic surfactant includes, but is not limited to, the sulfated anionic surfactants, sulfonated anionic surfactants, sulfosuccinates, sulfosuccinamates, taurates, isethionates, salts of fatty acids, carboxylated alcohol ethoxylates, ether sulfates and combinations thereof. The nonionic surfactant includes, but is not limited to, the alkanolamides, amine oxides, alkoxylated alcohols, alkoxylated phenols, block polymers and co-polymers, alkoxylated amines, alkyl polysaccharides, glucosamides, sugar esters and combinations thereof. The cationic surfactant includes, but is not limited to, alkyl dimethylamines, alkyl amidopropylamines, alkyl imidazoline derivatives, quaternised amine ethoxylates, and quaternary ammonium compounds. The amphoteric surfactant includes but, is not limited to, the monoacetates, diacetates, betaines, glycinates, imidazolines, imidazoline derivatives, monopropionates, dipropionates, hydroxy sultaines and combinations thereof. The silicone surfactant includes, but is not limited to silicone oil, dimethyl polysiloxane, or any of the surfactants described above having a silicon atom or dimethyl-siloxane group replacing the hydrophobic portion of the surfactant. The inventors have found that the dimethylpolysiloxane is effective in the coatings described herein. Examples include SE 21 (Wacker Silicones) or Dow Corning 346 (Dow Corning). Other surfactants that may be useful include TERGITOL NP-9 (Union Carbide), TERGITOL XH (Union Carbide), PEG (Union Carbide), or Fluorosurfactant (3M). The silicone surfactant can be included in the sealing composition in amounts ranging between 0.001 to 10% by weight. Alternatively, the silicone surfactant can be present in the ranges of about 0.001% to about 0.005% by weight, about 0.01% to about 0.05% by weight, about 0.1% to about 1% by weight, or 0.01 to 4% by weight depending on the desired application of the sealing composition.

Additional compounds are added to the sealing composition based on the environment where the sealer will be used. In tropical and semi-tropical areas, these additives include at least one UV inhibitor, at least one biocide, and at least one curing agent. When individual asphalt molecules absorb UV radiation from sunlight, the molecule's vibration may cause the asphalt layer to wrinkle, buckle, crack and ultimately completely fracture. As a result, granular loss will occur making the shingle even more susceptible to UV damage. Even worse, fissures in the asphalt layer may allow water to penetrate into the organic mat/substrate causing the shingles to swell and subsequently shrink when dry. Additional stress would develop when the shingle freezes and thaws. Ultimately, the shingle would fail and the roof will leak requiring replacement. Although acrylic polymers have good UV inhibition, it is desirable to add a compound that provides additional protection in high sun areas. The UV inhibitor can be a UV blocker such as Hindered Amine Light Stabilizers (HALS) that act by scavenging the radical intermediates formed in the photo-oxidation process, or a UV absorber such as Tinuvin tetrasziole, 2-(2'-hydroxyphenyl)benzotriazoles, 2-hydroxybenzophenones, esters of substituted or unsubstituted benzoic acids or 2-(2-hydroxyphenyl)-1,3,5-triazines that act by shielding the polymer from ultraviolet light, or mixtures thereof. The inventors have found that 2-Hydroxy-4-n-octyloxybenzophenone (Ashland Chemical, Ciba Geigy) is particularly effective in sealers used in the southern United States. Typically, the UV inhibitor will be present in the sealing composition in an amount ranging between about 0.0001% by weight to about 15% by weight of the total composition. Alternatively, the UV inhibitor can be present in the ranges of about 0.0001% to about 0.0005% by weight, about 0.0001% to about 4% by weight, 0.001% to about 0.005% by weight, 0.01% to about 0.1% by weight, about 0.1% to about 0.5% by weight, or about 0.1% to about 1% by weight, depending on the desired application of the sealing composition.

There are many types of biocides available to kill algae, mold, and mildews that can occur on roof surfaces. These include antimicrobials, algaecides, bactericides, preservatives, or mixtures thereof. More particularly, the biocide is selected from the group consisting of:
1. halogenated organic compounds, such as 2,4,4'-trichloro-2'-hydroxydiphenyl ether;
2. organosulfur compounds, such as methylene-dithiocyanate, 2-N-octyl-4-isothiazolin-3-one, 3,5-dimethyl-tetrahydro-1,3,5-2H-thiodiazine-2-thione;
3. s-triazine compounds, such as 2-methylthio-4-tert-butylamino-6-cyclopropyl-amino-s-triazine;
4. copper or copper compounds, such as copper sulfate, copper nitrate, copper-bis(8-hydroxyquinoline);
5. organotin compounds, such as tributyltin oxide and its derivatives; and
6. bactericides, such as silver and zinc compounds, oxybis-phenoxyarsine.

The inventors have found that the copper compounds, and in particular, copper sulfate is effective, both in the results it achieves and in keeping the cost of the sealer economical. Typically, the copper compound comprises about 0.001% to about 10% by weight of the composition. Alternatively, the copper compound may be present in the ranges of 0.001% to about 0.006% by weight, about 0.001% to about 0.06% by weight, about 0.01% to about 0.06% by weight, about 0.02% by weight to about 0.05% by weight, about 0.01% to about 1% by weight, or about 0.1% to about 5% by weight of a copper compound, depending on the desired application of the sealing compound.

Another additive often included in the inventive sealer is a curing agent. When the sealer is applied in very warm conditions, it is desirable to retard the curing time so as to allow the sealer to wick further into the shingles. An example of a suitable curing retard agent is ethylene glycol methyl butyl ether. Conversely, in colder environments, it may be desirable to add a curing agent that accelerates the cure time.

In view of the above, a typical composition for sealing and protecting asphalt shingles or other porous construction materials includes about 15% by weight to about 60% by weight of an acrylic polymer; about 0.01% by weight to about 10% by weight of a silicone surfactant; about 0.001% by weight to about 15% by weight of a UV inhibitor; about 0.001% by weight to about 10% by weight of an biocide, and water and/or other minor additives, preservatives or adjuvants comprising the remainder of the composition.

FIG. 1 shows the cross section of an asphalt shingle 10, half of which has been sealed with the inventive sealing composition. The left part of the shingle 20 has not been sealed while the right part 21 has been first washed and then protected with the inventive sealer. The shingle (20/21) includes a substrate 22, which is typically felt or fiberglass, upon which is placed an asphalt layer 23. Granular particles 24 are embedded into the asphalt layer 23. In the left part 20, particles of mold and algae 24 can be seen interspersed between the granules 26. Also in the left part 20, the asphalt base is shown exposed where the granules have been worn away. Conversely in the right part 21, a sealer 28 fills in the gaps left between the granules 24 and prevents mold and algae (not shown) from growing on the shingle. In addition, small fissures or cracks 29 in the asphalt layer 23 present at the time the sealing composition 28 is applied are filled in the right part 21 of the shingle. In contrast, the fissures/cracks 29 in the left part 20 remain open and unsealed.

Figure 2:
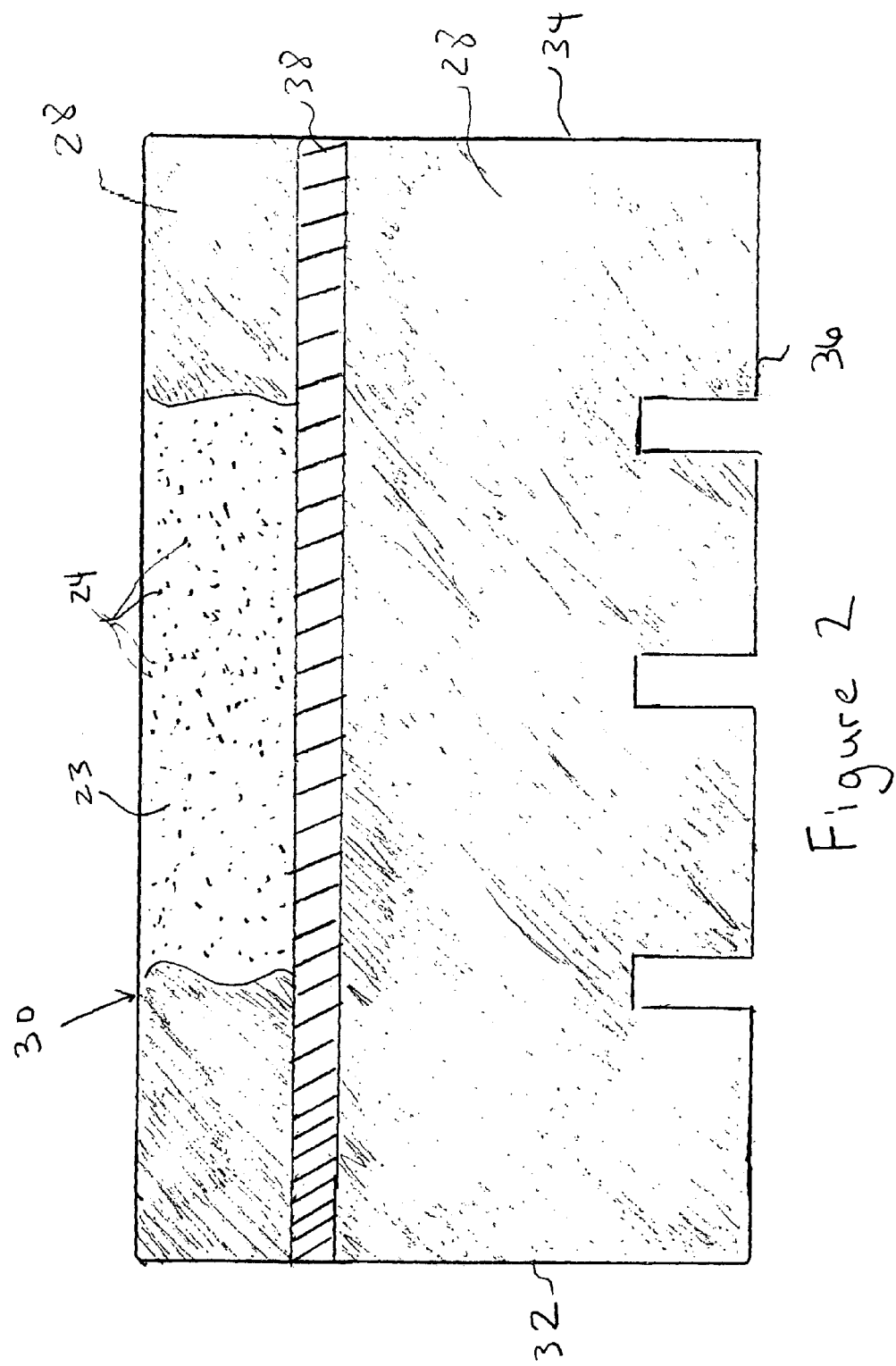
FIG. 2 is a top view of a composite asphalt shingle that has been sealed with the invention.

FIG. 2 shows the top view of an asphalt shingle 30 that has been protected with the inventive sealer. As shown therein, the sealer 28 wicks into the shingles along the two side edges 32, 34 and the leading edge 36 (also referred to as the forward or bottom edge.) Depending on the amount of the sealer applied, the age of the shingles, and the ambient conditions under which the sealer is applied, the sealing composition may wick upwards beneath the shingle and penetrate the entire shingle up to the tar adhesion strip 38. Normally, the adhesive strip 38 on shingles is up to a few inches from the leading edge 36 which can allow the leading edge 36 to curl, providing an exposed edge for wind to lift. Coated shingles 30 are sealed on all edges (32, 34, and 36) which eliminates any exposed edges and provides a more aerodynamic surface that is more resistant to wind damage. Moreover, standard 110 mph rated shingles (such as shingle 30 in FIG. 2) have been shown in laboratory tests to actually increase their structural strength by 215% and to increase their wind resistance by 65%.

Preferably, the sealing composition is formulated such that it is capable of wicking into a shingle or other porous construction material and impregnating at least about 10% up to 99% of the surface area of the shingle or other material. In the case of asphalt shingles, at least about 20%, preferably at least 50% and more preferably at least 90% of the surface area of the shingle, along the two side edges and the leading edge of the shingle, is impregnated or otherwise absorbed by the shingle with the sealers described herein. Alternatively, the sealing composition is absorbed and fully adhered to the surface area of the shingle or other material in the ranges of 30% to 100%, 40% to 100%, 50% to 100%, 60% to 100%, 70% to 100%, 80% to 100%, 90% to 100%, or 95% to 100%.

Though not wishing to be limited to any theories, it is believed that the sealing composition increases the longevity of asphalt shingles and other roofing or construction materials by two separate mechanisms; first by reducing the effects of asphalt degradation by UV radiation and second, by providing a water-resistant barrier. Use of a combination of transparent UV blockers (Hindered Amine Light Stabilizers—HALS) and UV absorbers similar to those used in varnishes can provide superior protection and extended shingle life. These products are used in a 2:1 ratio of TINUVIN (Ciba Giegy 292 HALS) and one part of any of the 400 series TINUVIN tetrasziole UV blockers. HALS do not block UV, they mop up the excess free radicals create from UV oxidation. In contrast, the Teratraziole UV blockers absorb the UV light similar to opaque pigments but remain clear additives, thereby preventing discoloration of the roofing surface. This combination provides excellent protection to the asphalt and helps it retain its plasticity.

With respect to the water resistant barrier provided by the sealer composition, contact of bulk water with the asphalt membrane is prevented, thereby preventing low molecular weight asphalt fractions from leaching out of the asphalt. Moreover, the sealing composition prevents contact of water with the organic substrate layer, thus eliminating the formation of ice and freeze thaw changes in the asphalt membranes. Water infusion into the organic substrate would also cause degradation of the substrate via biological attack. In general, the sealing composition of the present invention acts more like a fully adhered functional membrane than merely a paint type coating. Studies conducted have demonstrated that greater than 75% of initial elongation properties were retained even after 5 years exposure, versus no sealing or coatings using pigmented coated which tend to be much thicker and weaker in their chemical compositions while reducing adhesion qualities due to the addition of these fillers. These heavier viscosity coatings are unable to be wicked upwards into the shingle structure.

The process to apply the sealing compositions described above is dependent on the type and structure of material to which the sealer is being applied and to the ambient conditions. For asphalt shingles, it is desirable to provide a sealer that imparts rigidity to the shingle and provides a sufficient barrier to water, wind and airborne particles. A film of the dried sealer in the range of 1 to 8 mils provides these functions. The inventors have found that a dried film of 2 to 6 mils is desirable, while about 4 mils is preferred. Because the sealers of the present invention are water based, they must be applied to account for the shrinkage due to the evaporation of the water. In order to achieve a dried film of about 4 mils, a wet film of about 6 to 10 mils needs to be applied initially.

Steeper roofs may require two smaller applications of the inventive sealers so as to minimize runoff losses. As an example, roofs having a pitch of 6 inches in 12 inches or greater will typically require two applications/coatings. In general, it is preferred that the first coating/sealer is the thickest to maximize the amount of sealing composition that penetrates the shingle. As such, the first coating/sealer provides most of the desired adhesion between the granules and the asphalt/substrate matrix while the second coating/sealer is a monolithic membrane that provides additional protection. Conversely, roofs having a pitch of 5 inches in 12 inches or less can often be adequately sealed in a single application/coating. Moreover, the sealing compositions of this invention are very effective on low aspect roofs, which is typically considered to be roofs having pitches of 1 to 3 inches per 12 inches.

The type of construction material and its age will affect the amount of sealer that will need to be applied to achieve the desired thickness. In general, the typical application rate for asphalt shingles or cementatious/clay tiles is about 75 ft$^2$ per gallon to about 125 ft$^2$ per gallon, with the average being about 100 ft$^2$ per gallon. Older shingles and tiles may require additional amounts since they are more porous and more of the sealing material will be needed to achieve the desired thickness. The amount of material to be applied to other construction materials such as concrete floors or walls is less critical since wind resistance is not normally a concern.

In general, any type of conventional liquid applicator systems can be used to apply the composition including air sprayers, airless sprayers, hand sprayers, brushes, rollers or other applicators. In the case of asphalt shingles, the inventors have found that airless sprayers using a high volume, low pressure spray application provides the best application. The airless sprayer provides a more even sealing and promotes migration on and between the shingles. An example of an airless sprayer that works well with the inventive compositions is manufactured by Grayco. The Grayco sprayer operates at a pressure of 200 to 1800 psi. Low pressure sprayers operating at approximately 0 to 60 psi and at a flow rate between 2 to 6 gpm can also be used. An advantage of using a lower pressure sprayer is lower losses of the sealing material to the environment due to atomization. Single nozzle or multi-nozzle applicators can also be used to apply a uniform application of the sealing composition.

The compositions of this invention can be applied to newly installed construction materials as well as existing materials. It is highly recommended that existing structures be washed or otherwise cleaned prior to the application of the inventive compositions. For example, roofs that have been installed longer than 12 months should be power washed or cleaned in some other fashion to remove any organic materials such as algae, mildew, mold and dirt that may have accumulated on the surface.

The following examples illustrate the superior wind resistance and lack of damage that can be achieved by applying the inventive sealing compositions to installed or new asphalt shingles or cementatious/clay tiles. These examples are meant for illustrative purposes only and are not to be construed to limit the scope of the instant invention in any way whatsoever.

Example 1

The following compounds are illustrative of the invention described above:

TABLE 1

| Component | ROOF-GUARD 101 ™ | | ROOF-GUARD 102 ™ | |
| --- | --- | --- | --- | --- |
| | Type | Amount (% by weight) | Type | Amount (% by weight) |
| Acrylic polymer | Acrylic/vinyl co-polymer | 22-26 | Acrylic/vinyl co-polymer | 21-22 |
| Silicone surfactant | Dimethylpoly-siloxane | 0.01 to 4 | Dimethylpoly-siloxane | 0.01 to 4 |
| UV Inhibitor | 2-Hydroxy-4-n-octyloxybenzo-phenone | 0.0001 to 4 | 2-Hydroxy-4-n-octyloxybenzo-phenone | 0.0001 to 4 |
| Biocide | Copper Sulfate | <0.06 | Copper Sulfate | <0.06 |
| Other | Water | 70-75 | Water | 72-79 |

TABLE 2

| Property | ROOF-GUARD 101 ™ | ROOF-GUARD 102 ™ |
| --- | --- | --- |
| Density | 8.7 lbs/gal | 8.7 lbs/gal |
| pH | 8.0 | 8.0 |
| Theoretical surface tension | 15-30 dynes/cm | 15-30 dynes/cm |

Roof-Guard 101™ shown above in Tables 1 and 2 is formulated primarily for asphalt shingle roofs while Roof-Guard 102™ is for use primarily with clay, cementatious/concrete, or barrel tile roofs.

Example 2

Owens Corning Classic AR20 Three Tab Asphalt Shingles coated with Enviroseal Corporation Roof-guard 101™ Protective Sealer for shingles were tested in accordance with Florida Building Code (HVHZ) Test Protocol TAS 100-95, Test procedure for wind and wind driven rain resistance of discontinuous roof systems (PRI Asphalt Technologies, Tampa Fla.; test report May 5, 2005, test date Apr. 28, 2005.) The shingles used in this test were rated as 60 mph wind resistance. The roof surface used during this test had a 3 inch on 12 inch pitch. The Roof-Guard 101™ Protective Sealer was applied at a rate of 1.33 gallons per 100 square feet (75 ft$^2$/gal). The following results were achieved under this test:

TABLE 3

| Air Velocity Condition | Simulated Rainfall condition | Duration | Shingle Movement | Water infiltration under deck |
|---|---|---|---|---|
| 35 mph | 8.8 in/hr | 15 min | None | None |
| 0 mph | Off | 10 min | None | None |
| 70 mph | 8.8 in/hr | 15 | None | None |
| 0 mph | Off | 10 | None | None |
| 90 mph | 8.8 | 15 | None | None |
| 0 mph | Off | 10 | None | None |
| 110 mph | 8.8 | 5 | None | None |
| 0 mph | Off | 10 | None | None |

As can be seen from Table 3, the shingles coated with the inventive composition did not lift or experience any type of failure, even under extreme wind conditions. Under this test protocol, the ability to withstand 110 mph continuous wind conditions is equivalent to being able to withstand 130 mph gusts. Furthermore, the integrity of the coated shingles did not allow any water infiltration through the deck sheathing.

Example 3

Aged existing shingles (installed for 12 years) and new shingles were tested under ASTM D4491, Water Permeability of Geotextiles, Constant Head Method. This test is used for determining the hydraulic conductivity (water permeability) of geotextiles in terms of permittivity under standard testing conditions, in the uncompressed state. Both the aged and new shingles were treated using Roof-Guard 101™. Deviations from the standard included laboratory temperatures at 22±3° C., laboratory humidity at 50±15%, and oxygen content of the water was 6±2 ppm. The test results were corrected to 20° C. The following results were obtained from this test:

TABLE 4

| Material type | Flowrate (gal/min/ft$^2$) | Permittivity (s$^{-1}$) | Permeability (cm/s) | Change in Permeability between untreated and treated like materials (%) |
|---|---|---|---|---|
| 12 yr shingle - untreated | 1.168 | 0.03122 | 0.00322 | N/A |
| 12 yr shingle - treated | 0.729 | 0.01948 | 0.00226 | 29.8 |
| New shingle - untreated | 0.128 | 0.00342 | 0.00041 | N/A |
| New shingle - treated | 0.108 | 0.00290 | 0.00034 | 17.1 |

As seen from Table 4, treated shingles that are both aged 12 years and new show decreased permeability over the untreated shingles. In the case of aged shingles, the improvement in lower permeability was 29.8% while the new shingles showed a 17.1% improvement.

The sealing compositions and application methods described above can be used on any porous construction material used in numerous applications including, but not limited to, roofs, floors, walls, structural supports, foundations, roads, driveways, or any surface containing asphalt. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

We claim:

1. A composition for sealing and protecting at least one asphalt shingle or other porous construction materials consisting essentially of:
    (a) about 20% by weight to about 28% by weight of an acrylic polymer;
    (b) about 0.01% by weight to about 4% by weight of a silicone surfactant;
    (c) about 0.001% by weight to about 4% by weight of a UV inhibitor; and
    (d) about 0.001% by weight to less than 0.06% by weight of a biocide, with the remainder being water,
wherein the remain the composition contains about 20% to about 30% solids by weight, the UV inhibitor is 2-Hydroxy-4-n-octyloxybenzophenone, the biocide is copper sulfate, and all weight percentages are based on a total weight of the composition.

2. The composition of claim 1 wherein the acrylic polymer is an acrylic/vinyl co-polymer.

3. The composition of claim 1 wherein the silicone surfactant is polydimethylsiloxane.

4. A composition for sealing and protecting at least one asphalt shingle or other porous construction material comprising about 20% by weight to about 28% by weight of an acrylic/vinyl co-polymer, about 0.01% by weight to about 4% by weight of a silicone surfactant, about 0.001% by weight to about 4% by weight of a UV inhibitor, about 0.001% by weight to less than 0.06% by weight of a biocide, with the remainder being water, wherein the composition has a surface tension of about 15 to 30 dynes/cm as measured between the composition and an asphalt shingle, the composition wicks into and impregnates 20% to about 99% of a surface area of the shingle, the UV inhibitor is 2-Hydroxy-4-n-octyloxybenzophenone, the biocide is copper sulfate, and all weight percentages are based on a total weight of the composition.

5. A method for sealing at least one asphalt shingle or other porous construction materials comprising:
    a) Formulating a coating composition consisting essentially of about 20% by weight to about 28% by weight of an acrylic polymer, about 0.01% by weight to about 4% by weight of a silicone surfactant, about 0.001% by weight to about 4% by weight of a UV inhibitor, and about 0.001% by weight to less than 0.06% by weight of an biocide, with the remainder being water, wherein the UV inhibitor is 2-Hydroxy-4-n-octyloxybenzophenone, the biocide is copper sulfate, and all weight percentages are based on a total weight of the composition;
    b) Applying the coating composition to the shingle or other porous construction material to achieve a dried thickness of about 2 to 6 mils.

6. The method of claim 5 wherein step b) is completed by applying a single coat of the composition.

7. The method of claim 5 wherein step b) is completed by applying a first, thicker coat, allowing the first coat to dry and impregnate the shingle, and subsequently applying a second coat.

8. The method of claim 5 wherein the coating is applied to achieve a desired dried thickness of about 4 mils.

9. The method of claim 5 wherein the coating is applied at a wet thickness of about 6 to 10 mils to achieve the desired dried thickness.

10. The method of claim 5 further including prior to step b), washing the asphalt shingle or other construction material.

11. The method of claim 5 wherein step b) is completed by using an airless sprayer.

12. The method of claim 5 wherein step b) further includes applying the composition at a rate of about 75 ft² per gallon to about 125 ft² per gallon.

13. The method of claim 5 wherein step b) further includes applying the composition at a rate of about 100 ft² per gallon.

14. The method of claim 5 wherein the composition in step a), the acrylic polymer is an acrylic/vinyl co-polymer and the silicone surfactant is polydimethylsiloxane.

15. The composition of claim 1 wherein the composition as applied to an asphalt shingle has a surface tension of about 15 to 30 dynes/cm.

16. The composition of claim 1 wherein the composition as applied to an asphalt shingle wicks into and impregnates at least about 30% of a surface area of the shingle.

17. The composition of claim 4 further comprising ethylene glycol methyl butyl ether.

* * * * *